United States Patent Office 3,544,259
Patented Dec. 1, 1970

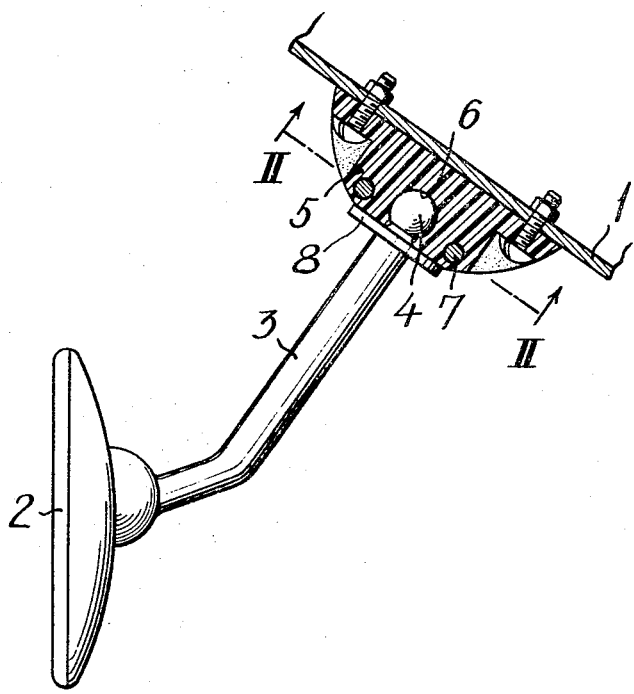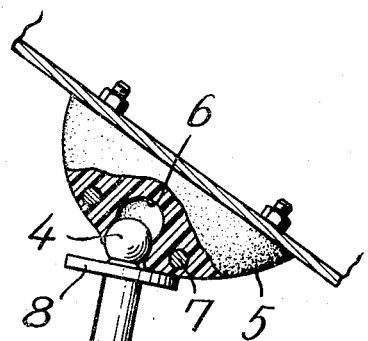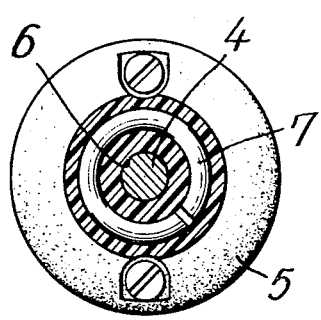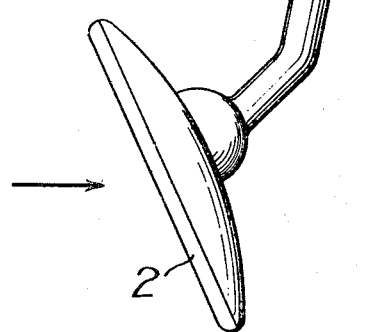

3,544,259
SUPPORTING APPARATUS FOR A MIRROR
Haruyasu Fujita, Tokyo, Japan, assignor to Kabushiki Kaisha Honda Gijutsu Kenkyusho, Yamato-machi, Kitaadachi-gun, Saitama-ken, Japan
Filed Dec. 18, 1967, Ser. No. 691,451
Claims priority, application Japan, Jan. 20, 1967, 42/5,489
Int. Cl. B60r 1/04
U.S. Cl. 248—475      3 Claims

ABSTRACT OF THE DISCLOSURE

A support arm for the rear view or side view mirror of a vehicle which has a ball projection removably mounted in a spherical concavity in an elastic member fixed to the body of the vehicle such that the mirror and arm are detached as a unit if struck by a force exceeding a predetermined maximum value.

BRIEF SUMMARY OF THE INVENTION

The present invention relates to supporting apparatus for a mirror, and in particular for a side view mirror or a rear view mirror of a vehicle.

It is a principal object of the invention to provide a mirror which breaks away from its support when subjected to an impact force thereby preventing serious injuries to a driver or passenger during sudden stops and collisions, in the case of a rear view mirror, or to a pedestrian who may be struck by the side view mirror of the vehicle.

A conventional side view mirror or rear view mirror has a universal joint connection with its supporting arm, but the supporting arm itself is fixed to the car body. Thus, the driver and passenger or a pedestrian may be injured if they strike such a mirror. It has been konwn that, for alleviating the shock or impact upon striking the mirror, the strength of the supporting arm may be weakened so that the arm will be broken when an impact force greater than a predetermined maximum is applied. A danger still exists because the broken end of the supporting arm may be sharp and thereby hazardous. Additionally, when the strength of the supporting arm is preliminarily weakened, the mirror surface vibrates with the vibration of the car body thereby making viewing in the mirror difficult and unsatisfactory.

In view of the above, the present invention has been conveived and is based on the concept that the strength of the supporting arm is not lowered but is left as is and, instead, the mirror support is so constructed that when an impact force larger than a certain value is applied to the mirror, the mirror separates from the vehicle together with its supporting arm, thereby absorbing and alleviating the shock of an impact with the mirror.

A feature of the invention is the utilization of a spherical projection on the support arm of the mirror which is engaged in a concavity in an elastic member secured to the vehicle, such that, upon application of an impact force to the mirror exceeding a predetermined maximum value, the projection becomes detached from the concavity so that the mirror and support arm are separated as a unit from the vehicle.

The supporting arm is disconnected from the elastic member by a rocking of the supporting arm or more properly by a lever action of the support arm on the elastic member. To facilitate the lever action, the lever is provided with a flange adjacent the projection which bears against the elastic member and serves as a fulcrum for the rocking movement of the arm a lever. In order to insure the lever action and the operation of the flange as a fulcrum, the elastic member contains a ring encircling the concavity to reinforce the elastic member in the region where it is to be contacted by the flange.

BRIEF DESCRIPTION OF THE DRAWING

FIG. 1 is a side view, partly in section, of a supporting apparatus according to the invention for a rear view mirror, FIG. 2 is a sectional view of the supporting apparatus taken along line II—II in FIG. 1, and FIG. 3 is a side view partially in section showing the disconnection of the rear view mirror.

DETAILED DESCRIPTION

In the drawing, numeral 1 denotes a wall of a car body to which a mirror 2 with a supporting arm 3 is fastened. The supporting arm 3 is provided at its bottom end with an enlarged projecting portion 4, which is pushed into and seated in a concavity 6 of an elastic member 5 secured to the car body wall 1. Alternatively, the portion 4 may be embedded and fixed in member 5 by means of a molding operation, and thereby secured when the member 5 is secured to the car body wall 1.

It is preferable that the projecting portion 4 is of spherical shape, as shown, and the concavity 6, into which the projecting portion 4 is inserted, is also of spherical shape so that the two may be closely engaged one with another. The concave portion 6 of the elastic attaching seat 5 is provided at the periphery of the neck portion thereof with a resilient metal ring 7 embedded therein for reinforcing that portion.

The construction of the support is such that the mirror 2 in ordinary condition is attached firmly to the car body wall 1 via the supporting arm 3 and the engagement of the projecting portion 4 in the elastic member 5 whereby the supporting arm 3 is immovable by small forces. The mirror 2 provides good viewing properties, because it is substantially free of vibration due to the vibration absorbing characteristics of the elastic member 5. However, when the mirror is forcibly struck, the supporting arm 3 is rocked about the projecting portion 4 by the impact force (shown by an arrow in FIG. 2) so that the projecting portion 4 comes out of the member 5 whereby the mirror 2 and arm 3 become separated from the rest of the support. Consequently, the shock is absorbed and injury is minimized whereby the present invention is pertinent as a safety measure for a motor car.

The supporting arm 3 is preferably provided at its bottom end portion with a flange 8. This enhances the removal of the projecting portion 4 from member 5 because the edge of the flange 8 serves as a fulcrum as shown in FIG. 3 when the supporting arm 3 is being rocked. The ring 7 serves, in this case, to support the edge of the flange 8 for preventing the deformation of the elastic member 5. Thereby, the outer diameter of the flange 8 should be approximately equal to the diameter of ring 7.

What is claimed is:

1. Apparatus comprising a mirror, and support means for securing said mirror to a body, said support means comprising separation means for disengaging the support means to uncouple the mirror from the body upon the application of a force to the mirror which exceeds a predetermined maximum value; said separation means comprising first and second detachably coupled members which are connected together and remain connected until a force exceeding said maximum value is applied to the mirror whereupon said members are disconnected; said first member being a supporting arm to which the mirror is secured and the second member being elastic and adapted for being secured to said body, said first member including a spherical projecting portion and said elastic member being provided with a spherical concavity removably receiving the projecting portion whereby, upon the application of a force which exceeds said maximum value, the mirror and said supporting arm separate as a unit from the elastic member; said elastic member including a ring embedded therein encircling the spherical concavity; said supporting arm including a flange at the end thereof remote from the mirror, said projecting portion extending beyond said flange such that with the projecting portion engaged in the concavity the flange is in abutment with the elastic member.

2. Apparatus as claimed in claim 1, wherein said flange is circular and has an outer diameter which is substantially equal to the diameter of the ring, said flange being axially aligned with the ring when the projecting portion is engaged in the concavity.

3. Apparatus as claimed in claim 1, wherein said elastic member has a rounded external surface.

References Cited
UNITED STATES PATENTS
1,246,937 10/1960 France.
1,251,433 12/1960 France.

OTHER REFERENCES
Happich, German Printed application, Ser. No. H 25,898, printed May 30, 1956, KL 63c 91, 2 pp. spec., 1 Sht. drawing.

ROY D. FRAZIER, Primary Examiner

F. DOMOTOR, Assistant Examiner

U.S. Cl. X.R.
287—21